United States Patent
Zhao et al.

(10) Patent No.: US 12,091,147 B1
(45) Date of Patent: Sep. 17, 2024

(54) SHIP HYDROGEN HYBRID PROPULSION SYSTEM BASED ON DOUBLE-ROTOR MOTOR AND METHOD THEREOF

(71) Applicant: SHANDONG UNIVERSITY OF SCIENCE AND TECHNOLOGY, Qingdao (CN)

(72) Inventors: Ziliang Zhao, Qingdao (CN); Bin Guo, Qingdao (CN); Yuhang Zhang, Qingdao (CN); Zhangu Wang, Qingdao (CN); Jitai Yu, Qingdao (CN); Jun Zhao, Qingdao (CN); Qinglin Zhu, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/739,229

(22) Filed: Jun. 10, 2024

(51) Int. Cl.
*B63H 21/20* (2006.01)
*B63B 17/00* (2006.01)
(Continued)

(52) U.S. Cl.
CPC ......... *B63H 21/20* (2013.01); *B63B 17/0027* (2013.01); *B63H 21/14* (2013.01);
(Continued)

(58) Field of Classification Search
CPC ........ B63H 21/20; B63H 21/14; B63H 21/17; B63H 21/21; B63H 23/30; B63H 23/34;
(Continued)

(56) References Cited

U.S. PATENT DOCUMENTS

| 7,497,285 | B1 | 3/2009 | Radev | |
| 2013/0037650 | A1* | 2/2013 | Heppe | B64C 37/02 244/2 |

(Continued)

FOREIGN PATENT DOCUMENTS

| CN | 116238677 A | 6/2023 |
| CN | 116729609 A | 9/2023 |

(Continued)

OTHER PUBLICATIONS

Qiu, Haibing et al., "Research on the Hybrid Electric System Using Double Rotor Flux Switching Permanent-Magnet Motor", Small and Special Electrical Machines, vol. 41, No. 11, Nov. 31, 2013, pp. 57-60.

*Primary Examiner* — Stephen P Avila

(57) ABSTRACT

A ship hydrogen hybrid power propulsion system and a method thereof are provided. The ship hydrogen hybrid power propulsion system includes a motor, a propeller, a power battery, an external motor controller, an internal motor controller, a hydrogen fuel cell, a hydrogen internal combustion engine, and a hydrogen storage tank. It combine the hydrogen fuel cell with the hydrogen internal combustion engine, and the hydrogen fuel cell is combined with the power battery and dynamically coupled with the internal motor and the external motor. Only a single hydrogen energy is needed, which is conducive to the layout and integration of the power system and achieves zero carbon emissions. Compared to the current dual motor power system, it has high integration, simpler power coupling, and a wider range of power output, making it particularly suitable for the high load and high-power output requirements of heavy-duty ships.

7 Claims, 2 Drawing Sheets

(51) Int. Cl.

| | | |
|---|---|---|
| *B63H 21/14* | (2006.01) | |
| *B63H 21/17* | (2006.01) | |
| *B63H 21/21* | (2006.01) | |
| *B63H 23/30* | (2006.01) | |
| *B63H 23/34* | (2006.01) | |
| *F01N 3/02* | (2006.01) | |
| *F02M 31/20* | (2006.01) | |
| *H01M 8/04014* | (2016.01) | |
| *H01M 8/04082* | (2016.01) | |
| *H01M 8/04111* | (2016.01) | |
| *H01M 8/04119* | (2016.01) | |
| *H01M 8/0662* | (2016.01) | |
| *H01M 10/44* | (2006.01) | |
| *H01M 16/00* | (2006.01) | |
| *H02K 11/33* | (2016.01) | |

(52) U.S. Cl.
CPC ............ *B63H 21/17* (2013.01); *B63H 21/21* (2013.01); *B63H 23/30* (2013.01); *B63H 23/34* (2013.01); *F01N 3/0205* (2013.01); *F02M 31/20* (2013.01); *H01M 8/04014* (2013.01); *H01M 8/04111* (2013.01); *H01M 8/04126* (2013.01); *H01M 8/04201* (2013.01); *H01M 8/0662* (2013.01); *H01M 10/44* (2013.01); *H01M 16/006* (2013.01); *H02K 11/33* (2016.01); *B63H 2021/205* (2013.01); *H01M 2220/20* (2013.01); *H01M 2250/20* (2013.01)

(58) Field of Classification Search
CPC .............. B63H 2021/205; H02K 11/33; B63B 17/0027; F01N 3/0205; F02M 31/20; H01M 8/04014; H01M 8/04111; H01M 8/04126; H01M 8/04201; H01M 8/0662; H01M 10/44; H01M 16/006; H01M 2220/20; H01M 2250/20
See application file for complete search history.

(56) References Cited

U.S. PATENT DOCUMENTS

| | | | |
|---|---|---|---|
| 2019/0299974 A1* | 10/2019 | Rauch | .................. B60W 20/16 |
| 2022/0144241 A1 | 5/2022 | Ortmann et al. | |

FOREIGN PATENT DOCUMENTS

| | | | |
|---|---|---|---|
| CN | 117360752 A | | 1/2024 |
| JP | H09222036 A | | 8/1997 |
| JP | 7171002 B1 | | 11/2022 |
| KR | 20160104489 A | * | 9/2016 |
| KR | 20190073050 A | | 6/2019 |

* cited by examiner

SHIP HYDROGEN HYBRID PROPULSION SYSTEM BASED ON DOUBLE-ROTOR MOTOR AND METHOD THEREOF

CROSS-REFERENCE TO RELATED APPLICATIONS

This application claims priority to Chinese Application No. 202410138558.X, filed on Feb. 1, 2024, entitled "SHIP HYDROGEN HYBRID PROPULSION SYSTEM AND METHOD THEREOF". These contents are hereby incorporated by reference.

TECHNICAL FIELD

The present disclosure relates to the technical field of ship propulsion equipment, in particular to a ship hydrogen hybrid power propulsion system based on a double-rotor motor and a method thereof.

BACKGROUND

Hydrogen energy is a beneficial supplement to existing forms of energy, an important carrier for terminal realization of green and low-carbon, and an important development direction for the future energy industry. The development of the global hydrogen energy industry is accelerating comprehensively, and technologies such as production, storage, and fuel cells of hydrogen energy are becoming increasingly mature, thus, hydrogen energy, with its zero emission advantage, has become an important support for achieving the targets of carbon peak and carbon neutrality.

Hydrogen energy is rarely applied in the field of ships, and current hydrogen hybrid power systems are mostly composed of power batteries and hydrogen fuel cells, or gasoline/diesel engines and hydrogen fuel cells, all of which require hydrogen energy to be used in combination with another energy source, which is not conducive to the layout and integration of power systems. The former requires a larger energy storage power battery, and the system thermal management is difficult. The latter also requires to install a fuel tank on the basis of the hydrogen storage tank, making the power system layout a challenge and unable to achieve zero carbon emissions. In addition, current hydrogen hybrid power systems often use dual motor power systems to improve performance, but dual motor power systems have problems such as low integration, high operating costs, and complex power coupling devices.

SUMMARY

The objective of the present disclosure is to provide a ship hydrogen hybrid power propulsion system based on a double-rotor motor and a method thereof, which only utilizes a single hydrogen energy, has advantages in high integration, low operating costs, and relatively simple power coupling.

In order to achieve the above objective, the technical solution adopted by the present disclosure is as follows:

A ship hydrogen hybrid power propulsion system, including a motor, a propeller, a power battery, an external motor controller, an internal motor controller, a hydrogen fuel cell, a hydrogen internal combustion engine, and a hydrogen storage tank;

wherein the motor includes a stator, an outer rotor, an inner rotor, and a lockup clutch, the outer rotor is located inside the stator, the inner rotor is located inside the outer rotor, and the inner rotor is capable of being locked or separated from the outer rotor through the lockup clutch;

one end of the inner rotor is connected to an input shaft, one end of the outer rotor is connected to an output shaft, and an end of the output shaft is connected to the propeller;

electromagnetic interaction is generated between the stator and the outer rotor, the stator and the outer rotor are defined as an external motor; and electromagnetic interaction is generated between the outer rotor and the inner rotor, and the outer rotor and the inner rotor are defined as an internal motor;

the power battery is electrically connected to a control end of the external motor through an external motor controller, and the power battery is electrically connected to a control end of the internal motor through an internal motor controller;

the hydrogen fuel cell is electrically connected to the power battery;

an output rotation shaft of the hydrogen internal combustion engine is connected to an end of the input shaft through a main clutch;

the hydrogen storage tank is respectively connected to a hydrogen input end of the hydrogen internal combustion engine and a hydrogen input end of the hydrogen fuel cell through a hydrogen transmission pipeline, and the hydrogen storage tank is used to transport hydrogen to the hydrogen fuel cell and the hydrogen internal combustion engine.

The advantageous technical effects of the present disclosure are shown as following:

The ship hydrogen hybrid power propulsion system based on a double-rotor motor and a method thereof of the present disclosure combine a hydrogen fuel cell with a hydrogen internal combustion engine, and the hydrogen fuel cell is combined with a power battery and dynamically coupled with an internal motor and an external motor. Only a single hydrogen energy is needed, which is conducive to the layout and integration of the power system and achieves zero carbon emissions; compared to the current dual motor power system, it has high integration, simpler power coupling, and a wider range of power output, making it particularly suitable for the high load and high-power output requirements of heavy-duty ships; low power uses the hydrogen fuel cells as the main power source to improve efficiency, while high power uses the hydrogen internal combustion engine as the main power source to enhance power performance and reduce operating costs.

Figure 1:
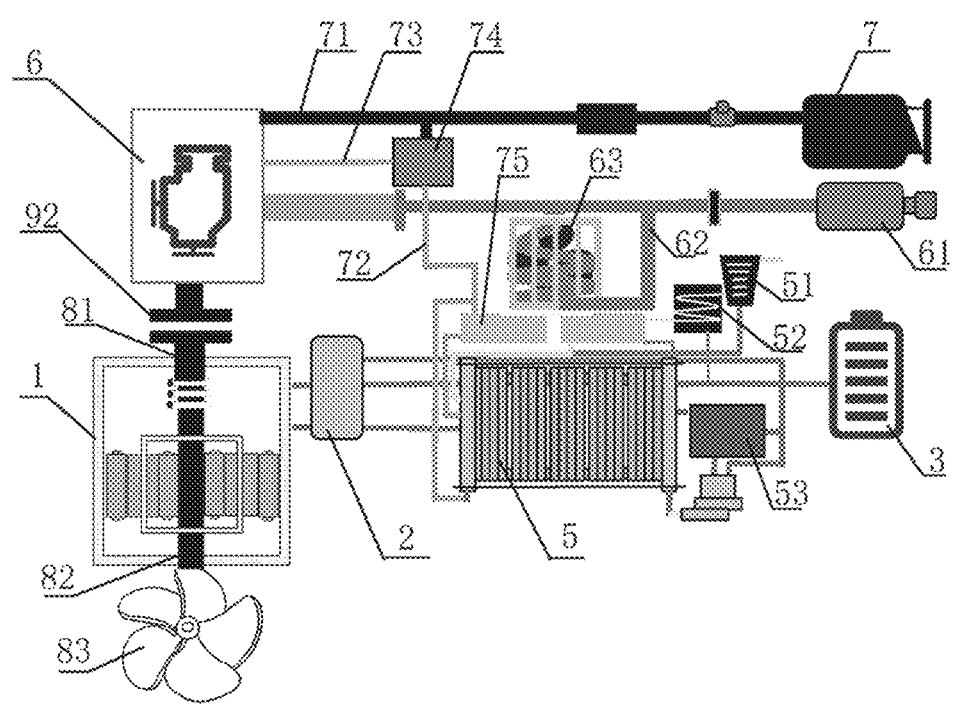
FIG. 1 is a schematic diagram of the structure of a ship hydrogen hybrid propulsion system in an embodiment of the present disclosure.

REFERENCE MARKS IN FIGURES 1. motor, 11. stator, 12. outer rotor, 13. inner rotor, 2. power controller, 3. power battery, 41. external motor controller, 42. internal motor controller, 43. electric brush slip-ring, 5. hydrogen fuel cell, 51. air compressor, 52. intercooler, 53. heat dissipation fan, 6. hydrogen internal combustion engine, 61. exhaust emission device, 62. heat conduction pipeline, 63. heat exchanger, 7. hydrogen storage tank, 71. first hydrogen transmission pipeline, 72. second hydrogen transmission pipeline, 73. third hydrogen transmission pipeline, 74. purifier, 75. humidifier, 81. input shaft, 82. output shaft, 83. propeller, 91. lockup clutch, 92. main clutch.

DETAILED DESCRIPTION OF THE EMBODIMENT

In order to make the technical problems, technical solutions and beneficial effects of the present invention clearer, the present invention will be further described in detail below with reference to the accompanying drawings and embodiments.

In the present invention, the terms "first," "second," "third" and the like are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

Figure 2:
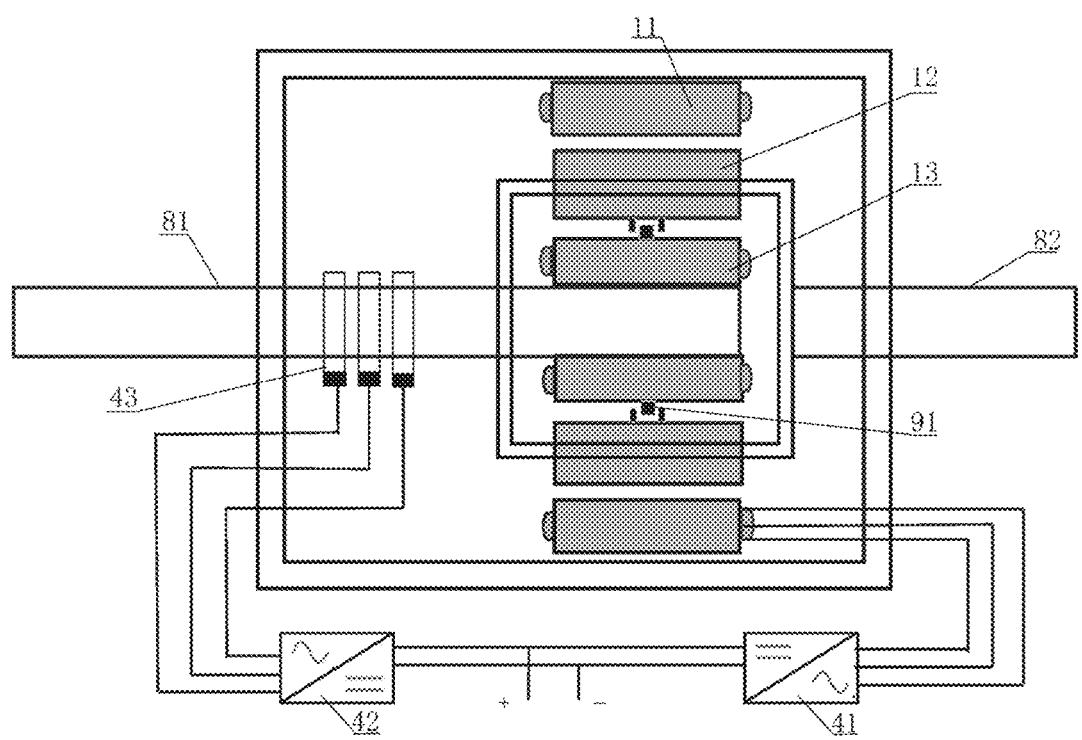
FIG. 2 is a schematic diagram of the structure of the motor parts in an embodiment of the present disclosure.

In the embodiments of the present disclosure, a ship hydrogen hybrid propulsion system and a method thereof are provided, as shown in FIGS. 1-2.

A ship hydrogen hybrid power propulsion system is provided, which includes a motor 1, a propeller 83, a power battery 3, an external motor controller 41, an internal motor controller 42, a hydrogen fuel cell 5, a hydrogen internal combustion engine 6, and a hydrogen storage tank 7.

The motor 1 includes a stator 11, an outer rotor 12, an inner rotor 13, and a lockup clutch 91. The outer rotor 12 is located inside the stator 11, the inner rotor 13 is located inside the outer rotor 12, and the inner rotor 13 is capable of being locked or separated from the outer rotor 12 through the lockup clutch 91, wherein the stator 11 is fixed on the motor casing, and the stator 11, the outer rotor 12, and the inner rotor 13 are arranged coaxially. The stator 11 is a wound structure, the outer rotor 12 is a squirrel cage structure, and the inner rotor 13 is a wound structure.

One end of the inner rotor 13 is connected to an input shaft 81, one end of the outer rotor 12 is connected to an output shaft 82, and the end of the output shaft 82 is connected to the propeller 83.

The electromagnetic interaction is generated between the stator 11 and the outer rotor 12, the stator 11 and the outer rotor 12 are defined as an external motor. The electromagnetic interaction is generated between the outer rotor 12 and the inner rotor 13, the outer rotor 12 and the inner rotor 13 are defined as an internal motor.

The power battery 3 is electrically connected to a control end of the external motor through an external motor controller 41, and the power battery 3 is electrically connected to a control end of the internal motor through an internal motor controller 42 and the electric brush slip-ring 43.

The hydrogen fuel cell 5 is electrically connected to the power battery 3, and the power battery 3 is charged by the hydrogen fuel cell 5.

An output rotation shaft of the hydrogen internal combustion engine 6 is connected to the end of the input shaft 81 through a main clutch 92.

The hydrogen storage tank 7 is respectively connected to a hydrogen input end of the hydrogen internal combustion engine 6 and a hydrogen input end of the hydrogen fuel cell 5 through a hydrogen transmission pipeline, and the hydrogen storage tank 7 is used to transport hydrogen to the hydrogen fuel cell 5 and the hydrogen internal combustion engine 6.

Specifically, the hydrogen storage tank 7 is connected to the hydrogen input end of the hydrogen internal combustion engine 6 through a first hydrogen transmission pipeline 71, and the hydrogen storage tank 7 is connected to the hydrogen input end of the hydrogen fuel cell 5 through a second hydrogen transmission pipeline 72. The hydrogen input end of the hydrogen internal combustion engine 6 is connected to the second hydrogen transmission pipeline 72 through the third hydrogen transmission pipeline 73. A one-way valve is installed on the third hydrogen transmission pipeline 73, which makes the second hydrogen transmission pipeline 72 unidirectionally conduction to the hydrogen input end of the hydrogen internal combustion engine 6.

The hydrogen storage tank 7 stores industrial by-product hydrogen, which is supplied from the first hydrogen transmission pipeline 71 to the hydrogen internal combustion engine 6, and from the second hydrogen transmission pipeline 72 to the hydrogen fuel cell 5. The remaining hydrogen from the hydrogen internal combustion engine 6 is further supplied to the hydrogen fuel cell 5 through the third hydrogen transmission pipeline 73 and the second hydrogen transmission pipeline 72. Wherein, the hydrogen internal combustion engine 6 does not require high purity of fuel hydrogen, and can directly use industrial by-product hydrogen without further purification, reducing ship operating costs.

The second hydrogen transmission pipeline 72 is provided with a purifier 74, and the purifier 74 is used to purify hydrogen gas delivered to the hydrogen input end of the hydrogen fuel cell 5. Industrial by-product hydrogen contains impurities and gases such as halides, carbon monoxide, sulfides, etc. The purifier 74 is used to eliminate these impurities and gases in the hydrogen flow, avoiding performance degradation of the hydrogen fuel cell 5.

The second hydrogen transmission pipeline 72 is provided with a humidifier 75, and the humidifier 75 is used to increase humidity of hydrogen gas delivered to the hydrogen input end of the hydrogen fuel cell 5, so as to meet the requirements of the hydrogen fuel cell 5 for hydrogen humidity.

The hydrogen internal combustion engine 6 is connected to an exhaust emission device 61, the exhaust emission device 61 is connected to a heat exchanger 63 through a heat conduction pipeline 62, and the heat exchanger 63 conducts heat to the hydrogen fuel cell 5. Wherein, the heat exchanger 63 is wrapped around a fan, the fan blows hot air towards the hydrogen fuel cell 5. Heat is transferred to the hydrogen fuel cell 5 through the heat exchanger 63 to preheat the hydrogen fuel cell 5. The hydrogen fuel cell 5 can restart and participate in operation after the temperature of the hydrogen fuel cell 5 reaches the appropriate temperature, which can solve the problem of cold start of the hydrogen fuel cell 5, reduce the probability of failure during low-temperature operation of the hydrogen fuel cell 5, and achieve good thermoelectric composite effect.

On one side of the hydrogen fuel cell 5, there is also a heat dissipation fan 53. The heat dissipation fan 53 blows the airflow through the hydrogen fuel cell 5, taking away the heat generated during its operation to avoid overheating and affecting battery performance.

An air input end of the hydrogen fuel cell 5 is connected to an air compressor 51 through an air pipeline, and the air compressor 51 is used to increase the pressure of air delivered to the air input end of the hydrogen fuel cell 5. The air pipeline is connected to an intercooler 52, and the intercooler 52 is used to reduce the temperature of the air delivered to the air input end of the hydrogen fuel cell 5. In this way, to provide high-pressure and suitable temperature air to the hydrogen fuel cell 5, in order to improve its operational performance.

The power controller 2 is connected to the control terminals of the hydrogen internal combustion engine 6, the lockup clutch 91, the main clutch 92, the external motor controller 41, the internal motor controller 42, the power battery 3, and the hydrogen fuel cell 5 through signal cables to achieve automatic control of the operation of each component.

A ship hydrogen hybrid propulsion method is provided, which uses a ship hydrogen hybrid propulsion system mentioned above. The method can selectively operate under the following five working conditions:

Working Condition 1: Ship Starting

When the ship starts, the main clutch 92 disconnects the output rotation shaft of the hydrogen internal combustion engine 6 and the input shaft 81 to stop the hydrogen internal combustion engine 6. The inner rotor 13 and the outer rotor 12 are separated by the lockup clutch 91, the power battery 3 provides electricity to the external motor 41, then the external motor starts, and the outer rotor of the external motor 12 drives the output shaft 82 to rotate, thereby driving the propeller 83 to rotate to drive the ship to start.

Working Condition 2: Ship Traveling at Low Speed

When the ship is traveling at low speed, when the charge of the power battery is at a set medium or high value, the main clutch 92 disconnects the output rotation shaft of the hydrogen internal combustion engine 6 and the input shaft 81 to stop the hydrogen internal combustion engine 6. The inner rotor 13 and the outer rotor 12 are separated by the lockup clutch 91, the power battery 3 provides electricity to the external motor 41, and the outer rotor 12 of the external motor drives the output shaft 82 to rotate, thereby driving the propeller 83 to rotate to drive the ship at low speed.

When the charge of the power battery 3 is at the set medium or high value and it is necessary to continue increasing the output power of the output shaft 82, the main clutch 92 disconnects the output rotation shaft of the hydrogen internal combustion engine 6 and the input shaft 81 to stop the hydrogen internal combustion engine 6. The inner rotor 13 and the outer rotor 12 are separated by the lockup clutch 91, and the power battery 3 provides electricity to the external motor through the external motor controller 41 to keep the external motor running. The power battery 3 provides electricity to the internal motor through the internal motor controller 42, and the internal motor starts, causing the speed of the inner rotor 13 to be higher than the speed of the outer rotor 12. And the coil of the inner rotor 13 cuts the magnetic field of the outer rotor 12 to generate ampere force to increase the torque of the outer rotor 12, thereby increasing the output torque of the output shaft 82.

When the charge of the power battery 3 is at a set low value, the inner rotor 13 and the outer rotor 12 are separated by the lockup clutch 91, the power battery 3 provides electricity to the external motor through the external motor controller 41, and the outer rotor 12 of the external motor drives the output shaft 82 to rotate. At the same time, the outer rotor 12 cuts the magnetic field of the stator 11 to generate current in the outer rotor 12, the current generates magnetic potential in the outer rotor 12 in rotation, then a gap magnetic field is generated between the outer rotor 12 and the inner rotor 13, then the main clutch 92 connects the output rotation shaft of the hydrogen internal combustion engine 6 and the input shaft 81 to start the hydrogen internal combustion engine. The hydrogen internal combustion engine 6 drives the inner rotor 13 to rotate and cut the gap magnetic field to generate current to charge the power battery 3, and the hydrogen fuel cell 5 charges the power battery 3.

Working Condition 3: Ship Traveling at Medium Speed

When the ship is traveling at medium speed, when the charge of the power battery 3 is at a set low value, the inner rotor 13 and the outer rotor 12 are separated by the lockup clutch 91, the power battery 3 provides electricity to the external motor through the external motor controller 41, and the outer rotor 12 of the external motor drives the output shaft 82 to rotate. At the same time, the outer rotor 12 cuts the magnetic field of the stator 11 to generate current in the outer rotor 12, the current generates magnetic potential in the outer rotor 12 in rotation, and a gap magnetic field is generated between the outer rotor 12 and the inner rotor 13, then the main clutch 92 connects the output rotation shaft of the hydrogen internal combustion engine 6 and the input shaft 81 to start the hydrogen internal combustion engine start 6. The hydrogen internal combustion engine 6 drives the inner rotor 13 to rotate and cut the gap magnetic field to generate current to charge the power battery 3, and the hydrogen fuel cell 5 charges the power battery 3.

When the charge of the power battery 3 is at the set median value, the following choices are made based on the required output power of the output shaft 82:

When the required output power is less than the minimum power of the hydrogen internal combustion engine 6, the main clutch 92 disconnects the output shaft of the hydrogen internal combustion engine 6 and the input shaft 81 to stop the hydrogen internal combustion engine 6, the inner rotor 13 and the outer rotor 12 are separated by the lockup clutch 91, the power battery 3 provides electricity to the external motor through the external motor controller 41, and the outer rotor 12 of the external motor drives the output shaft 82 to rotate. Alternatively, the main clutch 92 disconnects the output rotation shaft of the hydrogen internal combustion engine 6 and the input shaft 81 to stop the hydrogen internal combustion engine 6, the inner rotor 13 and the outer rotor 12 are separated by the lockup clutch 91, and the power battery 3 provides power to the external motor through the external motor controller 41 to keep the external motor running. The power battery 3 provides power to the internal motor through the internal motor controller 42, and the internal motor starts, causing the speed of the inner rotor 13 to be higher than the speed of the outer rotor 12, and the coil of the inner rotor 13 cuts the magnetic field of the outer rotor 12 to generate ampere force to increase the torque of the outer rotor 12, thereby increasing the output torque of the output shaft 82.

When the required output power is between the minimum power and the optimal power of the hydrogen internal combustion engine 6, the main clutch 92 connects the output rotation shaft of the hydrogen internal combustion engine 6 and the input shaft 81 to start the hydrogen internal combustion engine 6. The inner rotor 13 and the outer rotor 12 are separated by the lockup clutch 91, the power battery 3 provides electricity to the external motor through the external motor controller 41, the outer rotor 12 of the external motor drives the output shaft 82 to rotate, and the hydrogen internal combustion engine 6 drives the inner rotor 13 to rotate, causing the speed of the inner rotor 13 to be higher than the speed of the outer rotor 12, and the coil of the inner rotor 13 cuts the magnetic field of the outer rotor 12 to generate ampere force to increase the torque of the outer rotor 12. At the same time, the inner rotor 13 rotates and cuts the gap magnetic field to generate current to charge the power battery 3.

When the required output power is between the optimal power and the maximum power of the hydrogen internal combustion engine 6, the main clutch 92 connects the output rotation shaft of the hydrogen internal combustion engine 6 and the input shaft 81 to start the hydrogen internal combustion engine 6. The inner rotor 13 and the outer rotor 12 are locked by the lockup clutch 91, and the hydrogen internal combustion engine 6 directly drives the output shaft 82 to rotate. At the same time, the outer rotor 12 cuts the magnetic field of the stator 11 to generate current, based on the charge of the power battery 3, the external motor controller 41 determines whether to charge the power battery 3.

When the required output power exceeds the maximum power of the hydrogen internal combustion engine 6, the main clutch 92 connects the output rotation shaft of the hydrogen internal combustion engine 6 and the input shaft 81 to start the hydrogen internal combustion engine 6, and the inner rotor 13 and the outer rotor 12 are locked by the lockup clutch 91. At the same time, the power battery 3 provides electricity to the external motor through the external motor controller 41, and the output shaft 82 is driven to rotate by the hydrogen internal combustion engine 6 and the outer rotor 12 of the external motor to output high torque.

When the charge of the power battery 3 is at the set high value, the main clutch 92 disconnects the output rotation shaft of the hydrogen internal combustion engine 6 and the input shaft 81 to stop the hydrogen internal combustion engine 6, the inner rotor 13 and the outer rotor 12 are separated by the lockup clutch 91, the power battery 3 provides electricity to the external motor through the external motor controller 41, and the outer rotor 12 of the external motor drives the output shaft 82 to rotate. Alternatively, the main clutch 91 disconnects the output rotation shaft of the hydrogen internal combustion engine 6 and the input shaft 81 to stop the hydrogen internal combustion engine 6, the inner rotor 13 and the outer rotor 12 are separated by the lockup clutch 91, the power battery 3 provides power to the external motor through the external motor controller 41 to keep the external motor running. The power battery 3 provides power to the internal motor to start the internal motor, causing the speed of the inner rotor 13 to be higher than the speed of the outer rotor 12, and the coil of the inner rotor 13 cuts the magnetic field of the outer rotor 12 to generate ampere force to increase the torque of the outer rotor 12, thereby increasing the output torque of the output shaft 82.

Working Condition 4: Ship Traveling at High Speed,

When the ship is traveling at high speed, the main clutch 92 connects the output rotation shaft of the hydrogen internal combustion engine 6 and the input shaft 81 to start the hydrogen internal combustion engine 6, the inner rotor 13 and the outer rotor 13 are locked by the lockup clutch 91, and the hydrogen internal combustion engine 6 directly drives the output shaft 82 to rotate. At the same time, the outer rotor 12 cuts the magnetic field of the stator 11 to generate current, based on the charge of the power battery 3, the external motor controller 41 determines whether to charge the power battery 3.

Working Condition 5: Ship Braking

When the ship brakes, the rotation of the output shaft 82 drives the outer rotor 11 to cut the magnetic field of the stator 11, so as to generate current to charge the power battery 3, so as to achieve the recovery of braking energy.

The ship hydrogen hybrid power propulsion system and a method based on a double-rotor motor of the present disclosure combine a hydrogen fuel cell 5 with a hydrogen internal combustion engine 6, and the hydrogen fuel cell 5 is combined with a power battery 3 and dynamically coupled with an internal motor and an external motor. Only a single hydrogen energy is needed, which is conducive to the layout and integration of the power system and achieves zero carbon emissions. Compared to the current dual motor power system, it has high integration, simpler power coupling, and a wider range of power output, making it particularly suitable for the high load and high-power output requirements of heavy-duty ships. In low power state, it uses the hydrogen fuel cell 5 as the main power source to improve efficiency, while in high power state, it uses the hydrogen internal combustion engine 6 as the main power source to enhance power performance and reduce operating costs.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. A ship hydrogen hybrid power propulsion system, comprising a motor, a propeller, a power battery, an external motor controller, an internal motor controller, a hydrogen fuel cell, a hydrogen internal combustion engine, and a hydrogen storage tank;

wherein the motor comprises a stator, an outer rotor, an inner rotor, and a lockup clutch, the outer rotor is located inside the stator, the inner rotor is located inside the outer rotor, and the inner rotor is capable of being locked or separated from the outer rotor through the lockup clutch;

one end of the inner rotor is connected to an input shaft, one end of the outer rotor is connected to an output shaft, and an end of the output shaft is connected to the propeller;

electromagnetic interaction is generated between the stator and the outer rotor, the stator and the outer rotor are defined as an external motor; and electromagnetic interaction is generated between the outer rotor and the inner rotor, and the outer rotor and the inner rotor are defined as an internal motor;

the power battery is electrically connected to a control end of the external motor through an external motor controller, and the power battery is electrically connected to a control end of the internal motor through an internal motor controller;

the hydrogen fuel cell is electrically connected to the power battery;

an output rotation shaft of the hydrogen internal combustion engine is connected to an end of the input shaft through a main clutch;

the hydrogen storage tank is respectively connected to a hydrogen input end of the hydrogen internal combustion engine and a hydrogen input end of the hydrogen fuel cell through a hydrogen transmission pipeline, and the hydrogen storage tank is used to transport hydrogen to the hydrogen fuel cell and the hydrogen internal combustion engine;

the hydrogen storage tank is connected to the hydrogen input end of the hydrogen internal combustion engine through a first hydrogen transmission pipeline, and the hydrogen storage tank is connected to the hydrogen input end of the hydrogen fuel cell through a second hydrogen transmission pipeline.

2. The ship hydrogen hybrid propulsion system according to claim 1, wherein
the second hydrogen transmission pipeline is provided with a purifier, and the purifier is used to purify hydrogen gas delivered to the hydrogen input end of the hydrogen fuel cell.

3. The ship hydrogen hybrid propulsion system according to claim 1, wherein
the second hydrogen transmission pipeline is provided with a humidifier, and the humidifier is used to increase humidity of hydrogen gas delivered to the hydrogen input end of the hydrogen fuel cell.

4. The ship hydrogen hybrid propulsion system according to claim 1, wherein
the hydrogen internal combustion engine is connected to an exhaust emission device, the exhaust emission device is connected to a heat exchanger through a heat conduction pipeline, and the heat exchanger conducts heat to the hydrogen fuel cell.

5. The ship hydrogen hybrid propulsion system according to claim 1, wherein
an air input end of the hydrogen fuel cell is connected to an air compressor through an air pipeline, and the air compressor is used to increase the pressure of air delivered to the air input end of the hydrogen fuel cell.

6. The ship hydrogen hybrid propulsion system according to claim 5, wherein
the air pipeline is connected to an intercooler, and the intercooler is used to reduce the temperature of air delivered to the air input end of the hydrogen fuel cell.

7. A ship hydrogen hybrid propulsion method, comprising a ship hydrogen hybrid propulsion system according to claim 1, characterized in that the method selectively operates under the following five working conditions:

working condition 1: when the ship starts, the main clutch disconnects the output rotation shaft of the hydrogen internal combustion engine and the input shaft to stop the hydrogen internal combustion engine; the inner rotor and the outer rotor are separated by the lockup clutch, the power battery provides electricity to the external motor, then the external motor starts, and the outer rotor of the external motor drives the output shaft to rotate;

working condition 2: when the ship is traveling at low speed, when the charge of the power battery is at a set medium or high value, the main clutch disconnects the output rotation shaft of the hydrogen internal combustion engine and the input shaft to stop the hydrogen internal combustion engine; the inner rotor and the outer rotor are separated by the lockup clutch, the power battery provides electricity to the external motor, and the outer rotor of the external motor drives the output shaft to rotate;

when the charge of the power battery is at the set medium or high value and it is necessary to continue increasing the output power of the output shaft, the main clutch disconnects the output rotation shaft of the hydrogen internal combustion engine and the input shaft to stop the hydrogen internal combustion engine; the inner rotor and the outer rotor are separated by the lockup clutch, and the power battery provides electricity to the external motor to keep the external motor running; the power battery provides electricity to the internal motor, and the internal motor starts, causing the speed of the inner rotor to be higher than the speed of the outer rotor; and the coil of the inner rotor cuts the magnetic field of the outer rotor to generate ampere force to increase the torque of the outer rotor;

when the charge of the power battery is at a set low value, the inner rotor and the outer rotor are separated by the lockup clutch, the power battery provides electricity to the external motor, and the outer rotor of the external motor drives the output shaft to rotate; at the same time, the outer rotor cuts the magnetic field of the stator to generate current in the outer rotor, the current generates magnetic potential in the outer rotor in rotation, then a gap magnetic field is generated between the outer rotor and the inner rotor, then the main clutch connects the output rotation shaft of the hydrogen internal combustion engine and the input shaft, and the hydrogen internal combustion engine starts; the hydrogen internal combustion engine drives the inner rotor to rotate and cut the gap magnetic field to generate current to charge the power battery, and the hydrogen fuel cell charges the power battery;

working condition 3: when the ship is traveling at medium speed, when the charge of the power battery is at a set low value, the inner rotor and the outer rotor are separated by the lockup clutch, the power battery provides electricity to the external motor, and the outer rotor of the external motor drives the output shaft to rotate; at the same time, the outer rotor cuts the magnetic field of the stator to generate current in the outer rotor, the current generates magnetic potential in the outer rotor in rotation, and a gap magnetic field is generated between the outer rotor and the inner rotor, then the main clutch connects the output rotation shaft of the hydrogen internal combustion engine and the input shaft, and the hydrogen internal combustion engine starts; the hydrogen internal combustion engine drives the inner rotor to rotate and cut the gap magnetic field to generate current to charge the power battery, and the hydrogen fuel cell charges the power battery;

when the charge of the power battery is at the set median value, the following choices are made based on the required output power of the output shaft:

when the required output power is less than the minimum power of the hydrogen internal combustion engine, the main clutch disconnects the output shaft of the hydrogen internal combustion engine and the input shaft to stop the hydrogen internal combustion engine, the inner rotor and the outer rotor are separated by the lockup clutch, the power battery provides electricity to the external motor, and the outer rotor of the external motor drives the output shaft to rotate; alternatively, the main clutch disconnects the output rotation shaft of the hydrogen internal combustion engine and the input shaft to stop the hydrogen internal combustion engine, the inner rotor and the outer rotor are separated by the lockup clutch, and the power battery provides power to the external motor to keep the external motor running; the power battery provides power to the internal motor, and the internal motor starts, causing the speed of the inner rotor to be higher than the speed of the outer rotor, and the coil of the inner rotor cuts the magnetic field of the outer rotor to generate ampere force to increase the torque of the outer rotor;

when the required output power is between the minimum power and the optimal power of the hydrogen internal combustion engine, the main clutch connects the output rotation shaft of the hydrogen internal combustion engine and the input shaft to start the hydrogen internal combustion engine; the inner rotor and the outer rotor are separated by the lockup clutch, the power battery provides electricity to the external motor, the outer rotor of the external motor drives the output shaft to rotate, and the hydrogen internal combustion engine drives the inner rotor to rotate, causing the speed of the inner rotor to be higher than the speed of the outer rotor, and the coil of the inner rotor cuts the magnetic field of the outer rotor to generate ampere force to increase the torque of the outer rotor; at the same time, the inner rotor rotates and cuts the gap magnetic field to generate current to charge the power battery;

when the required output power is between the optimal power and the maximum power of the hydrogen internal combustion engine, the main clutch connects the output rotation shaft of the hydrogen internal combustion engine and the input shaft to start the hydrogen internal combustion engine; the inner rotor and the outer rotor are locked by the lockup clutch, and the hydrogen internal combustion engine directly drives the output shaft to rotate; at the same time, the outer rotor cuts the magnetic field of the stator to generate current, based on the charge of the power battery, the external motor controller determines whether to charge the power battery;

when the required output power exceeds the maximum power of the hydrogen internal combustion engine, the main clutch connects the output rotation shaft of the hydrogen internal combustion engine and the input shaft to start the hydrogen internal combustion engine, and the inner rotor and the outer rotor are locked by the lockup clutch; at the same time, the power battery provides electricity to the external motor, and the output shaft is driven to rotate by the hydrogen internal combustion engine and the outer rotor of the external motor;

when the charge of the power battery is at the set high value, the main clutch disconnects the output rotation shaft of the hydrogen internal combustion engine and the input shaft to stop the hydrogen internal combustion engine, the inner rotor and the outer rotor are separated by the lockup clutch, the power battery provides electricity to the external motor, and the outer rotor of the external motor drives the output shaft to rotate; alternatively, the main clutch disconnects the output rotation shaft of the hydrogen internal combustion engine and the input shaft to stop the hydrogen internal combustion engine, the inner rotor and the outer rotor are separated by the lockup clutch, the power battery provides power to the external motor to keep the external motor running, the power battery provides power to the internal motor to start the internal motor, causing the speed of the inner rotor to be higher than the speed of the outer rotor, and the coil of the inner rotor cuts the magnetic field of the outer rotor to generate ampere force to increase the torque of the outer rotor;

working condition 4: when the ship is traveling at high speed, the main clutch connects the output rotation shaft of the hydrogen internal combustion engine and the input shaft, the hydrogen internal combustion engine starts, the inner rotor and the outer rotor are locked by the lockup clutch, and the hydrogen internal combustion engine directly drives the output shaft to rotate; at the same time, the outer rotor cuts the magnetic field of the stator to generate current, based on the charge of the power battery, the external motor controller determines whether to charge the power battery;

working condition 5: when the ship brakes, the rotation of the output shaft drives the outer rotor to cut the magnetic field of the stator to generate current to charge the power battery.

* * * * *